United States Patent
Kataoka et al.

(10) Patent No.: US 11,120,395 B2
(45) Date of Patent: Sep. 14, 2021

(54) DELIVERY SYSTEM, SERVER, MOVABLE BODY, AND BAGGAGE DELIVERY METHOD

(71) Applicant: TOYOTA JIDOSHA KABUSHIKI KAISHA, Toyota (JP)

(72) Inventors: Naomi Kataoka, Nagoya (JP); Toshiaki Niwa, Okazaki (JP); Yasuhiro Baba, Kamo-gun (JP); Katsuhiko Yourou, Toyonaka (JP); Kazuyuki Kagawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 16/181,667

(22) Filed: Nov. 6, 2018

(65) Prior Publication Data

US 2019/0164127 A1 May 30, 2019

(30) Foreign Application Priority Data

Nov. 28, 2017 (JP) .............................. JP2017-227991

(51) Int. Cl.
  *G06Q 10/08* (2012.01)
  *G05D 1/02* (2020.01)
  *G05D 1/00* (2006.01)

(52) U.S. Cl.
  CPC ..... *G06Q 10/08355* (2013.01); *G05D 1/0088* (2013.01); *G05D 1/0225* (2013.01)

(58) Field of Classification Search
  CPC ................. G08G 1/202; G08G 1/0145; G08G 1/096816; G08G 1/096827; G05D 2201/0212; G05D 1/0225; G01C 21/3438; G01C 21/34; G01C 21/3492
  See application file for complete search history.

(56) References Cited

U.S. PATENT DOCUMENTS

| | | | |
|---|---|---|---|
| 2005/0071081 A1* | 3/2005 | Hirose | G08G 1/096872 701/414 |
| 2017/0083911 A1 | 3/2017 | Phillips | |
| 2018/0267536 A1* | 9/2018 | Goldberg | G05D 1/0088 |
| 2018/0341274 A1* | 11/2018 | Donnelly | B60R 16/037 |
| 2019/0016331 A1* | 1/2019 | Carlson | B60W 30/06 |
| 2019/0170527 A1* | 6/2019 | Inoue | G01C 21/26 |

FOREIGN PATENT DOCUMENTS

| | | |
|---|---|---|
| JP | 2002-321828 A | 11/2002 |
| JP | 2015-191351 A | 11/2015 |
| JP | 2017-49967 A | 3/2017 |
| JP | 2017-151041 A | 8/2017 |
| WO | 2017/154566 A1 | 9/2017 |

* cited by examiner

*Primary Examiner* — Kenneth J Malkowski
(74) *Attorney, Agent, or Firm* — Sughrue Mion, PLLC

(57) ABSTRACT

A delivery system includes a vehicle and a management server configured to communicate with the vehicle. The vehicle is configured to perform unmanned driving and used to deliver a baggage to a designated delivery destination. When an arrival time of a user, who moves to the delivery destination without riding on the vehicle, to the delivery destination is set, the management server is configured to transmit, to the vehicle, an instruction for moving the vehicle in accordance with a delivery route searched to allow the vehicle to reach the delivery destination at the set arrival time. The vehicle moves to the delivery destination in accordance with the instruction.

7 Claims, 13 Drawing Sheets

FIG.6

<USER INFORMATION>

| USER ID | RESERVATION INFORMATION | | DELIVERY DESTINATION | ROUTE INFORMATION | ARRIVAL TIME | CURRENT LOCATION | UTILIZATION STATUS | |
|---|---|---|---|---|---|---|---|---|
| | UTILIZATION LOCATION | UTILIZATION TIME | | | | | VEHICLE ID | DELIVERY STATUS |
| U0001 | X1 | 12:00 | X2 | AAA | 14:00 | P1 | E001 | DELIVERY COMPLETED |
| U0002 | Y1 | 16:00 | Y2 | BBB | 17:30 | P2 | E002 | DURING DELIVERY |
| U0003 | Z1 | 18:00 | — | CCC | — | P3 | E003 | BEFORE DELIVERY |
| ... | ... | ... | ... | ... | ... | ... | ... | ... |
| ... | ... | ... | ... | ... | ... | ... | ... | ... |

FIG.7

<VEHICLE INFORMATION>

| VEHICLE ID | UTILIZATION STATUS | | | | TRAVELING ROUTE INFORMATION | CURRENT LOCATION | DELIVERY TIME | SOC |
|---|---|---|---|---|---|---|---|---|
| | WAITING TO BE DISPATCHED | DURING DELIVERY | DURING STANDBY STATE | DELIVERY COMPLETED | | | | |
| E001 | | | | O | DDD | P4 | 14:00 | 50% |
| E002 | | O | | | EEE | P5 | 17:30 | 80% |
| E003 | O | | | | FFF | P6 | — | 60% |
| ... | ... | ... | ... | ... | ... | ... | ... | ... |

DELIVERY SYSTEM, SERVER, MOVABLE BODY, AND BAGGAGE DELIVERY METHOD

This nonprovisional application is based on Japanese Patent Application No. 2017-227991 filed on Nov. 28, 2017 with the Japan Patent Office, the entire contents of which are hereby incorporated by reference.

BACKGROUND

Field

The present disclosure relates to a delivery system, a server, a movable body, and a baggage delivery method. In particular, the present disclosure relates to: a baggage delivery system employing a movable body configured to perform unmanned driving; a server and a movable body each used for the baggage delivery system; and a baggage delivery method.

Description of the Background Art

In recent years, development of automated driving technique has been progressed rapidly, and services utilizing movable bodies capable of automated driving have been proposed. For example, Japanese Patent Laying-Open No. 2015-191351 discloses a transportation system for operating a movable body configured to perform automated driving, so as to carry a user or a baggage.

In this transportation system, arrangements are made for dispatch of a movable body to the user and for a staff who operates the movable body in order to reduce uneasiness of the user who utilizes the movable body configured to perform automated driving (see Japanese Patent Laying-Open No. 2015-191351).

In the transportation system described in Japanese Patent Laying-Open No. 2015-191351, the arrangements are made not only for the dispatch of the movable body to the user but also for the staff in view of a possibility that the user may feel uneasy about the operation or the like of the movable body configured to perform automated driving. A case is assumed in which the user rides on and utilizes the movable body after the dispatch of the movable body.

On the other hand, the following use case can be considered: after a movable body configured to perform unmanned driving is dispatched to a user, the user puts only his/her baggage on the movable body, sets a delivery destination such as the user's home, and heads for the delivery destination using public transportation or the like without carrying the heavy baggage. According to this, even a person having no driver's license, a person having a difficulty in driving a movable body, or the like can utilize, as a baggage delivery vehicle, the movable body configured to perform unmanned driving. In Japanese Patent Laying-Open No. 2015-191351 described above, no framework for utilizing a movable body configured to perform unmanned driving for the above use case is particularly taken into consideration.

SUMMARY

The present disclosure has been made to solve the problem and has an object to provide: a delivery system that employs a movable body configured to perform unmanned driving and deliver a baggage to a designated delivery destination and that is highly convenient for a person having no driver's license, a person having a difficulty in driving a movable body, or the like; a server and the movable body each used for the delivery system; and a baggage delivery method.

A delivery system according to the present disclosure includes a movable body, and a server configured to communicate with the movable body. The movable body is configured to perform unmanned driving and used to deliver a baggage to a designated delivery destination. When an arrival time of a user, who moves to the delivery destination without riding on the movable body, to the delivery destination is set, the server is configured to transmit, to the movable body, an instruction for moving the movable body in accordance with a delivery route searched to allow the movable body to reach the delivery destination at the set arrival time. The movable body moves to the delivery destination in accordance with the instruction.

According to the above-described configuration, since the movable body reaches the delivery destination in accordance with the arrival time of the user, the baggage can be delivered to the delivery destination on time. Hence, there can be implemented a delivery system highly convenient for a user having no driver's license, a user having a difficulty in driving a movable body, or the like.

When it is determined that the movable body is unable to reach the delivery destination at the set arrival time, the server may be configured to transmit a delivery delay notification to a mobile terminal of the user.

Accordingly, the user can recognize that the delivery of the baggage by the movable body will be delayed.

When it is determined that the movable body will reach the delivery destination at a time earlier than the set arrival time by a predetermined time, the server may be configured to transmit, to the movable body, a standby instruction for bringing the movable body into a standby state at a parking area.

Accordingly, the baggage can be delivered to the delivery destination on time in accordance with the arrival time of the user to the delivery destination.

The movable body includes: a power storage device configured to store power for traveling; and a charger configured to charge the power storage device using power supplied from a power supply facility external to the movable body. The power supply facility may be provided at the parking area, and the standby instruction may include an instruction for bringing the movable body into the standby state while charging the power storage device using the power supply facility at the parking area.

Accordingly, when the amount of charge in the power storage device is low, the power storage device can be charged using the power supply facility during the standby time at the parking area.

From a first route and a second route having a heavier traffic amount than a traffic amount of the first route, the second route may be selected for the delivery route.

Accordingly, security can be increased during the baggage delivery performed by the movable body performing unmanned driving.

Further, a server according to the present disclosure includes: a communication device configured to communicate with a movable body, the movable body being configured to perform unmanned driving and used to deliver a baggage to a designated delivery destination; and a processor configured to perform first and second processes. The first process is a process for, when an arrival time of a user, who moves to the delivery destination without riding on the movable body, to the delivery destination is set, searching for a delivery route to allow the movable body to reach the delivery destination at the set arrival time. The second process is a process for transmitting, to the movable body via the communication device, an instruction for moving the movable body in accordance with the searched delivery route.

Further, a movable body according to the present disclosure is a movable body configured to perform unmanned driving and used to deliver a baggage to a designated delivery destination, and includes: a communication device configured to communicate with a server; and a controller. The controller is configured to receive, from the server via the communication device, a setting of an arrival time of a user, who moves to the delivery destination without riding on the movable body, to the delivery destination. The controller is configured to: search for a delivery route to allow the movable body to reach the delivery destination at the set arrival time; and perform control for moving the movable body in accordance with the searched delivery route.

Further, a delivery method according to the present disclosure is a method for delivering a baggage to a designated delivery destination using a movable body configured to perform unmanned driving, and includes: setting an arrival time of a user, who moves to the delivery destination without riding on the movable body, to the delivery destination; searching for a delivery route to allow the movable body to reach the delivery destination at the set arrival time; transmitting, from a server to the movable body, an instruction for moving the movable body in accordance with the searched delivery route; and moving the movable body to the delivery destination in accordance with the instruction.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 shows a configuration of data stored in a user information DB of the management server.

FIG. 7 shows a configuration of data stored in a vehicle information DB of the management server.

DESCRIPTION OF THE PREFERRED EMBODIMENTS

Figure 1:
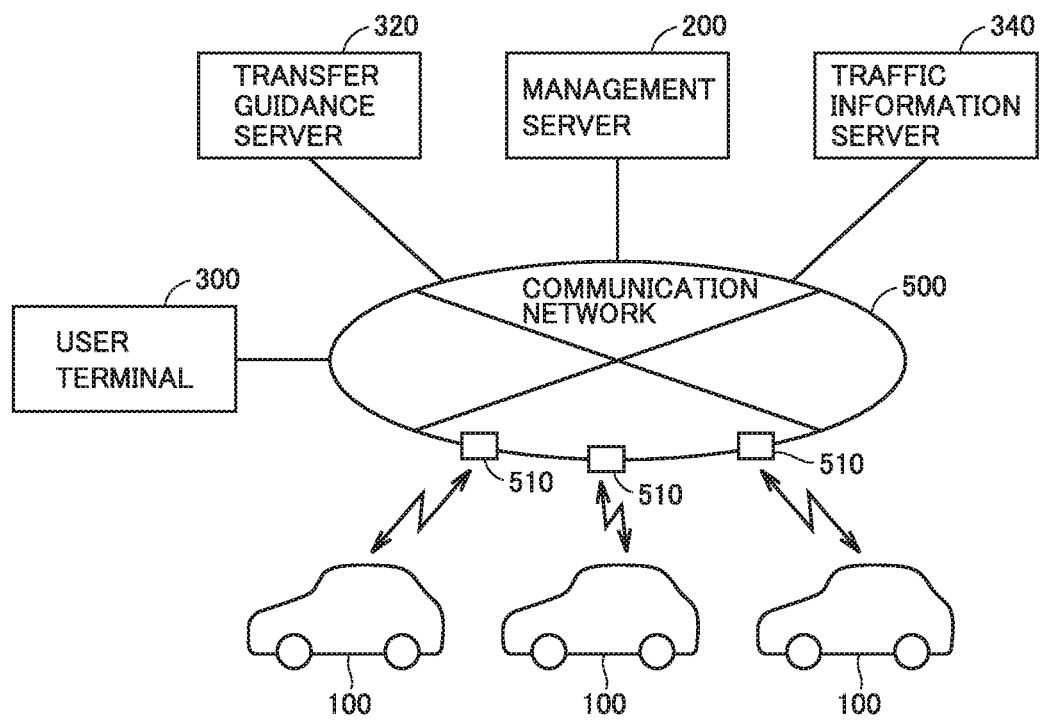
FIG. 1 schematically shows an entire configuration of a delivery system.

The following describes embodiments of the present disclosure with reference to figures in detail. It should be noted that the same or corresponding portions are given the same reference characters and are not described repeatedly.

First Embodiment

<System Configuration>

FIG. 1 schematically shows an entire configuration of a delivery system 10 according to a first embodiment. With reference to FIG. 1, delivery system 10 includes a plurality of electrically powered vehicles (hereinafter, also simply referred to as "vehicles") 100, a management server 200, a user terminal 300, a transfer guidance server 320 and a traffic information server 340. Each vehicle 100, management server 200, user terminal 300, transfer guidance server 320 and traffic information server 340 are configured to communicate with one another through a communication network 500 such as the Internet or a telephone line. It should be noted that each vehicle 100 is configured to send and receive information to and from a base station 510 of communication network 500 through wireless communication.

Vehicle 100 is a movable body configured to perform unmanned driving. Vehicle 100 is configured to generate driving power for traveling using electric power from a power storage device mounted thereon as described below with reference to FIG. 3. In this first embodiment, vehicle 100 is further configured to allow the power storage device to be charged using electric power supplied from a power supply external to the vehicle, and vehicle 100 is an electric vehicle, a so-called plug-in hybrid vehicle, or the like, for example (hereinafter, a power supply external to the vehicle will be also referred to as "external power supply" and charging of a power storage device with the external power supply will be also referred to as "external charging"). It should be noted that vehicle 100 is not necessarily limited to the vehicle capable of the external charging and may be a hybrid vehicle having no externally charging function.

Management server 200 is configured to communicate with each vehicle 100, user terminal 300 transfer guidance server 320, and traffic information server 340 via communication network 500 so as to exchange various types of information with each vehicle 100, user terminal 300, transfer guidance server 320, and traffic information server 340. Operations of management server 200 will be described in detail later.

User terminal 300 is a terminal of a user who utilizes delivery system 10, and is a mobile terminal such as a smartphone, for example. The user who wishes to utilize delivery system 10 can make an application from user terminal 300 so as to utilize vehicle 100.

Transfer guidance server 320 is configured to provide a traveling route, a transportation to be utilized, a utilization time, and the like when the user of user terminal 300 utilizes public transportation or the like to move from a designated departure location to an arrival location. For this transfer guidance server 320, there can be employed various types of known transfer guidance servers each for providing a transfer guidance service for public transportation or the like.

Traffic information server 340 is configured to provide an traffic amount, a traffic congestion state, or the like for a road via which each vehicle 100 can travel. For this traffic information server 340, there can be also employed various types of known traffic information servers each for providing a traffic information service for roads.

Figure 2:
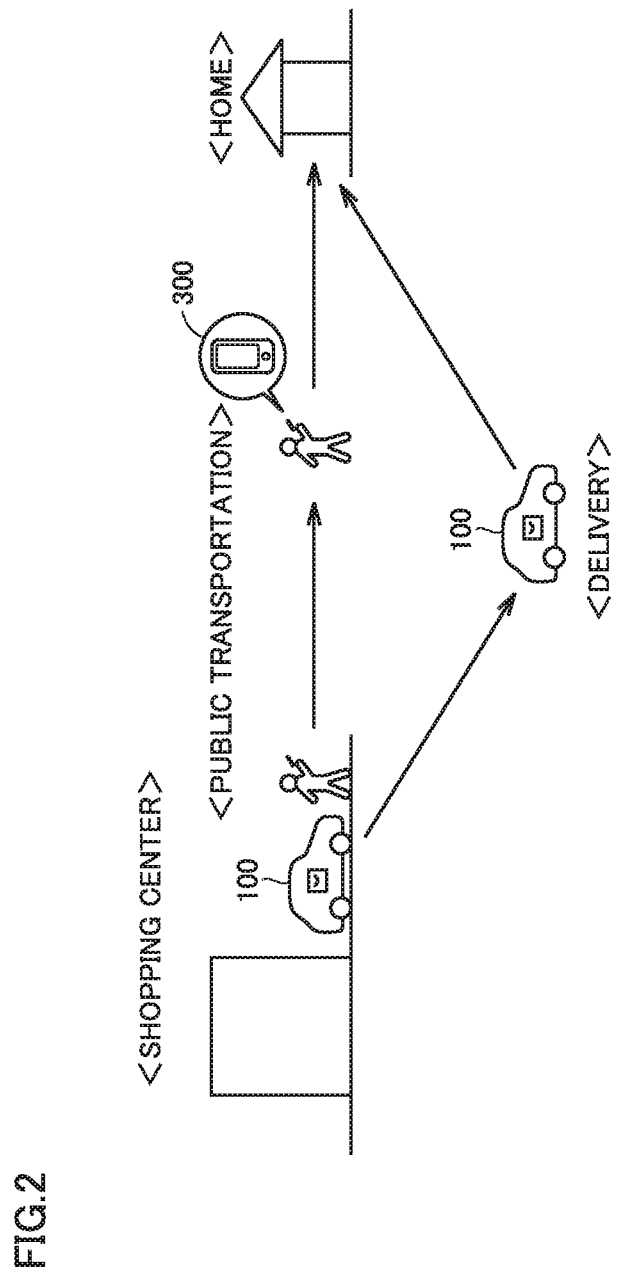
FIG. 2 shows an exemplary utilization manner of the delivery system.

FIG. 2 shows an exemplary utilization manner of delivery system 10. With reference to FIG. 2, in this example, there is provided a service in which: the user, who did shopping in a shopping center, a supermarket, or the like, puts a baggage with purchased items onto vehicle 100 and sets a delivery destination (hereinafter referred to as "home"), and the baggage is delivered to the home using vehicle 100 configured to perform unmanned driving. The user does not ride on vehicle 100, and moves to the home using public transportation or the like. Accordingly, even a user having no driver's license, a user having a difficulty in driving a vehicle, or the like can utilize, as a baggage delivery vehicle, vehicle 100 configured to perform unmanned driving. Moreover, the user can move to the home using public transportation or the like without carrying the heavy baggage.

In this delivery system 10, for example, when an arrival time of the user to the home is set using the service provided by transfer guidance server 320, vehicle 100 moves to the home in accordance with a delivery route searched to allow vehicle 100 to reach the home at the set arrival time. Accordingly, vehicle 100 reaches the home in accordance with the arrival time of the user at the home, whereby the baggage can be delivered to the home on time. Thus, there can be implemented a delivery system highly convenient even for a user having no driver's license, a user having a difficulty in driving a vehicle, or the like.

Figure 3:
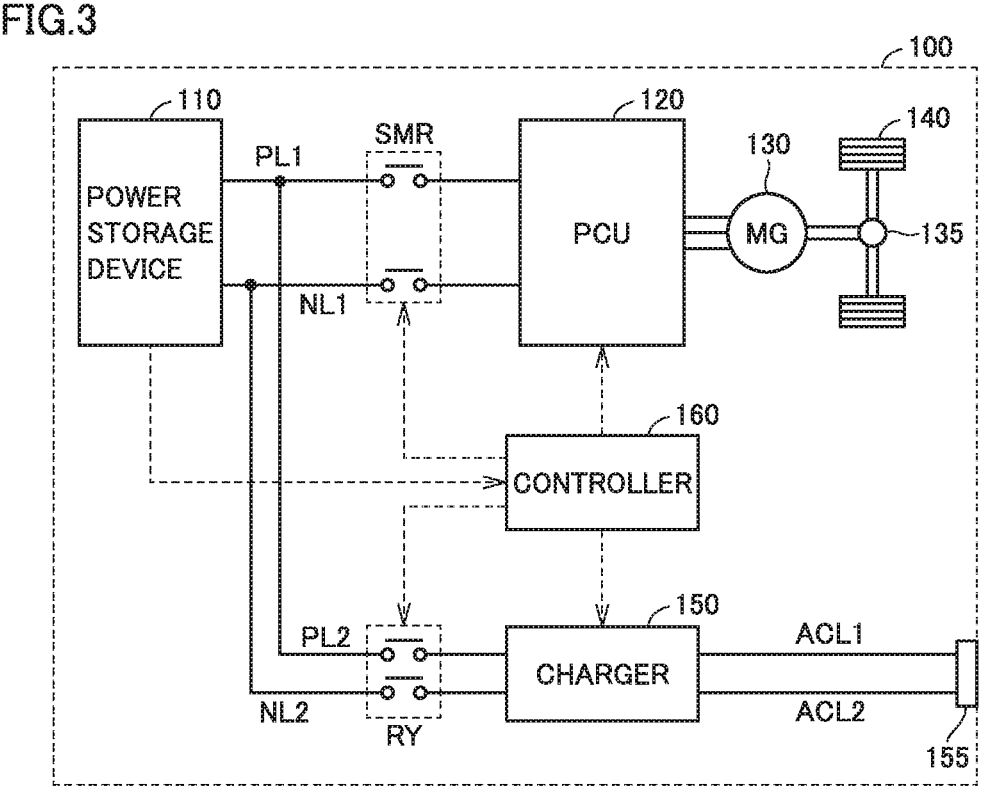
FIG. 3 shows a configuration of a vehicle.

FIG. 3 shows a configuration of vehicle 100 shown in FIG. 1. With reference to FIG. 3, vehicle 100 includes power storage device 110, a system main relay SMR, a PCU (Power Control Unit) 120, a motor generator 130, a power transmission gear 135, and driving wheels 140. Moreover, vehicle 100 further includes a charger 150, an inlet 155, a charging relay RY, and a controller 160.

Power storage device 110 is a power storage component configured to be chargeable/dischargeable. Power storage device 110 is configured to include a secondary battery such as a lithium ion battery or a nickel-hydrogen battery, or include a power storage element such as an electric double layer capacitor, for example. Via system main relay SMR, power storage device 110 supplies PCU 120 with electric power for generating driving power of vehicle 100. Further, power storage device 110 stores electric power generated by motor generator 130. Power storage device 110 outputs, to controller 160, detection values of voltage and current of power storage device 110 detected by a sensor not shown in the figure.

PCU 120 is a driving device for driving motor generator 130, and is configured to include a power converting device such as a converter, an inverter, or the like (all not shown). PCU 120 is controlled by a control signal from controller 160 and converts DC power received from power storage device 110 into AC power for driving motor generator 130.

Motor generator 130 is an AC rotating electrical machine, such as a permanent-magnet type synchronous motor including a rotor having a permanent magnet embedded therein. Output torque from motor generator 130 is transmitted to driving wheels 140 via power transmission gear 135, which is constituted of a speed reducer and a power split device. In this way, vehicle 100 travels. Moreover, motor generator 130 is capable of generating electric power using rotation power of driving wheels 140 when vehicle 100 operates for braking. The electric power thus generated is converted by PCU 120 into charging power for power storage device 110.

It should be noted that in a hybrid vehicle including an engine (not shown) in addition to motor generator 130, required vehicle driving power is generated by operating the engine and motor generator 130 cooperatively. In this case, power storage device 110 can be charged using electric power generated by rotation of the engine.

Charger 150 is connected to power storage device 110 through charging relay RY. Moreover, charger 150 is connected to inlet 155 by power lines ACL 1, ACL 2. Charger 150 converts electric power supplied from the power supply, which is external to the vehicle and electrically connected to inlet 155, into electric power with which power storage device 110 can be charged.

Controller 160 includes an ECU (Electronic Control Unit), various sensors, and a navigation device, a communication module, and the like (not shown in FIG. 3), receives signals from a sensor group, outputs a control signal to each device, and controls vehicle 100 and each device. Controller 160 performs various types of control for performing unmanned driving of vehicle 100 (such as driving control, braking control, and steering control). Controller 160 generates control signals for controlling PCU 120 a steering device not shown in the figure, charger 150, and the like. Moreover, controller 160 receives detection values of voltage and current of power storage device 110, and calculates a state of charge (hereinafter, also referred to as "SOC") of power storage device 110 based on these detection values.

Figure 4:
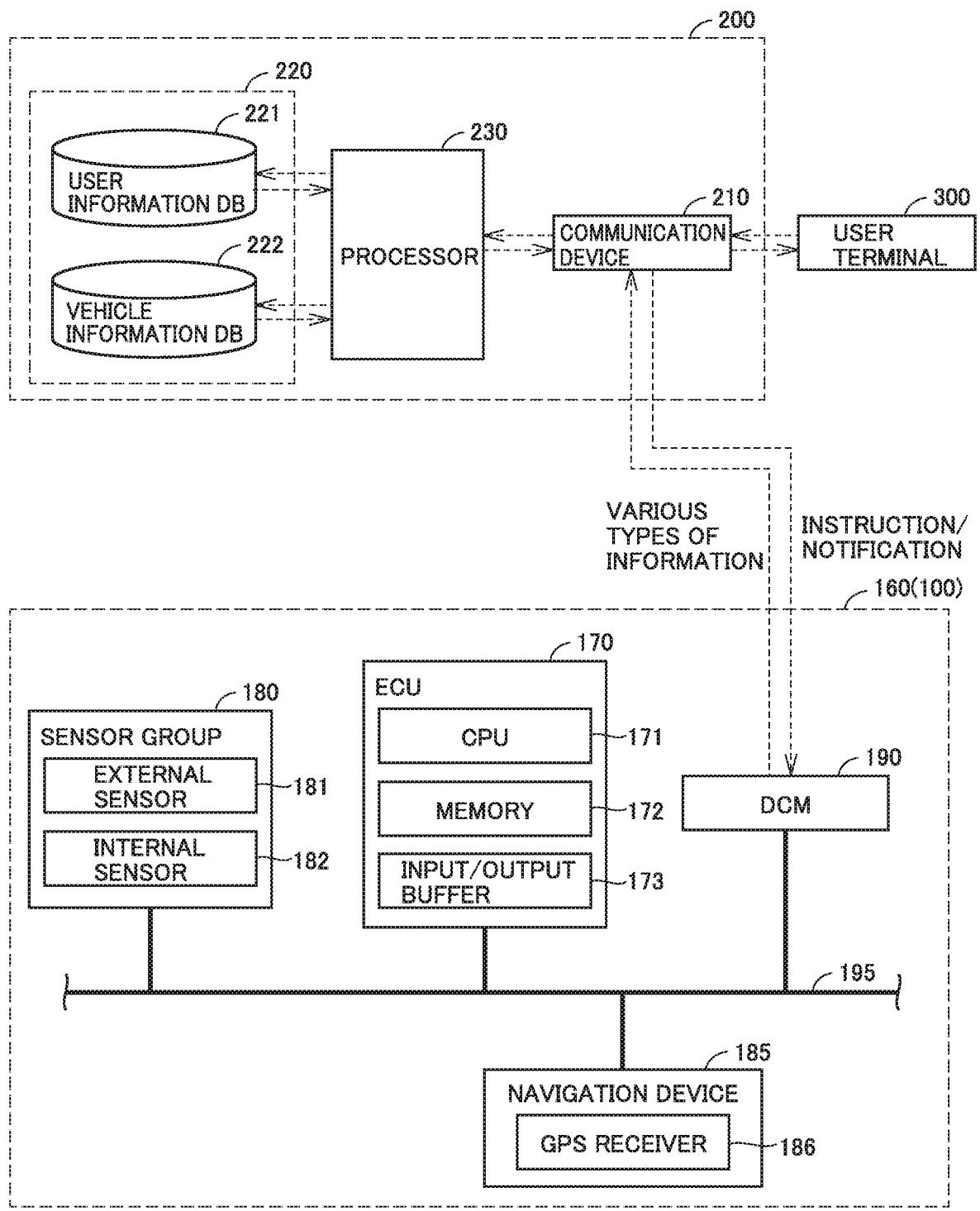
FIG. 4 shows configurations of a controller of the vehicle and a management server more in detail.

FIG. 4 shows configurations of controller 160 of vehicle 100 and management server 200 more in detail. With reference to FIG. 4, controller 160 of vehicle 100 includes an ECU 170, a sensor group 180, a navigation device 185, and a communication module 190. ECU 170, sensor group 180, navigation device 185, and communication module 190 are connected to one another via an in-vehicle wired network 195 such as a CAN (Controller Area Network).

ECU 170 is configured to include a CPU (Central Processing Unit) 171, a memory 172, and an input/output buffer 173. In response to a signal from each sensor of sensor group 180, ECU 170 controls devices to bring vehicle 100 into a desired state. For example, ECU 170 performs various types of control for implementing the unmanned driving of vehicle 100 by controlling PCU 120 (FIG. 3) serving as a driving device and the steering device (not shown).

It should be noted that the term "unmanned driving" refers to driving in which driving operations of vehicle 100 such as acceleration, deceleration, and steering are performed without driving operations by a driver. Specifically, this vehicle 100 is configured to perform full-automated driving defined as "Level 5". That is, in the unmanned driving by ECU 170, a driver does not need to ride on the vehicle under all the situations.

Therefore, controller 160 includes sensor group 180 to detect situations inside and outside vehicle 100. Sensor group 180 includes: an external sensor 181 configured to detect a situation outside vehicle 100; and an internal sensor 182 configured to detect information corresponding to a traveling state of vehicle 100 and detect a steering operation, an accelerating operation, and a braking operation.

External sensor 181 includes a camera, a radar, a LIDAR (Laser Imaging Detection And Ranging), and the like, for example (all not shown). The camera captures an image of a situation outside vehicle 100 and outputs, to ECU 170, captured-image information regarding the situation outside vehicle 100. The radar transmits electric wave (for example, millimeter wave) to surroundings of vehicle 100 and receives electric wave reflected by an obstacle to detect the obstacle. Then, the radar outputs, to ECU 170, a distance to the obstacle and a direction of the obstacle as obstacle information regarding the obstacle. The LIDAR transmits light (typically, ultraviolet rays, visible rays, or near infrared rays) to surroundings of vehicle 100 and receives light reflected by an obstacle to measure a distance to the reflecting point and detect the obstacle. The LIDAR outputs, to ECU 170, the distance to the obstacle and a direction of the obstacle as obstacle information, for example.

Internal sensor 182 includes a vehicle speed sensor, an acceleration sensor, a yaw rate sensor, and the like, for example (all not shown). The vehicle speed sensor is provided at a wheel of vehicle 100 or a drive shaft that is rotated together with the wheel, detects a rotating speed of the wheel, and outputs vehicle speed information including the speed of vehicle 100 to ECU 170. The acceleration sensor includes: a forward/backward acceleration sensor configured to detect acceleration in a forward/backward direction of vehicle 100, and a lateral acceleration sensor configured to detect lateral acceleration of vehicle 100, for example. The acceleration sensor outputs acceleration information including both the accelerations to ECU 170. The yaw rate sensor detects a yaw rate (rotation angle speed) around the vertical axis of the center of gravity of vehicle 100. The yaw rate sensor is, for example, a gyro sensor, and outputs yaw rate information including the yaw rate of vehicle 100 to ECU 170.

Navigation device 185 includes a GPS receiver 186 configured to specify a location of vehicle 100 based on electric waves from satellites (not shown). Navigation device 185 performs various types of navigation processes of vehicle 100 using the location information (GPS information) of vehicle 100 specified by GPS receiver 186. Specifically, navigation device 185 calculates a traveling route (expected traveling route or target route) from the current location of vehicle 100 to a destination based on GPS information of vehicle 100 and a road map data stored in the memory (not shown), and outputs information of the target route to ECU 170. It should be noted that during the utilization of vehicle 100 by the user, navigation device 185 notifies the target route to the user by way of presentation on a display and audio output from a speaker (both not shown).

Communication module 190 is an in-vehicle DCM (Data Communication Module), and is configured to perform bidirectional data communication with a communication device 210 of management server 200 via communication network 500 (FIG. 1).

Management server 200 includes communication device 210, a storage device 220, and a processor 230. Communication device 210 is configured to perform bidirectional data communication with communication module 190 of vehicle 100 and user terminal 300 via communication network 500 (FIG. 1). Moreover, although not illustrated particularly, communication device 210 is configured to perform data communication with transfer guidance server 320 and traffic information server 340 via communication network 500.

Storage device 220 includes a user information database (DB) 221 and a vehicle information database (DB) 222. User information DB 221 stores information of a user who utilizes delivery system 10. A user who wishes to utilize delivery system 10 can utilize delivery system 10 by registering himself/herself as a member in advance, and information of the user who has registered as a member is stored in user information DB 221. A data configuration of user information DB 221 will be described later.

Vehicle information DB 222 stores information of each vehicle 100 utilized in delivery system 10. Each vehicle 100 to be utilized in delivery system 10 can be utilized in delivery system 10 through a registration procedure in advance. Information of registered vehicle 100 is stored in vehicle information DB 222. A data configuration of vehicle information DB 222 will also be described later.

When processor 230 receives a utilization reservation for vehicle 100 from user terminal 300, processor 230 associates information regarding the reservation (utilization time, utilization location, and the like) with the information of the user of user terminal 300, and stores it in user information DB 221. Then, based on the vehicle information stored in vehicle information DB 222, processor 230 notifies, to vehicle 100 currently unused (waiting to be dispatched), a dispatch instruction for dispatch to the user who has made an application for utilization reservation from user terminal 300.

Moreover, when processor 230 receives a baggage delivery destination and a delivery start instruction from user terminal 300, processor 230 sets an arrival time of the user to the delivery destination and searches for a delivery route for vehicle 100 to allow vehicle 100 to reach the delivery destination at the arrival time. Then, processor 230 notifies the searched delivery route and the delivery start instruction to vehicle 100.

Figure 5:
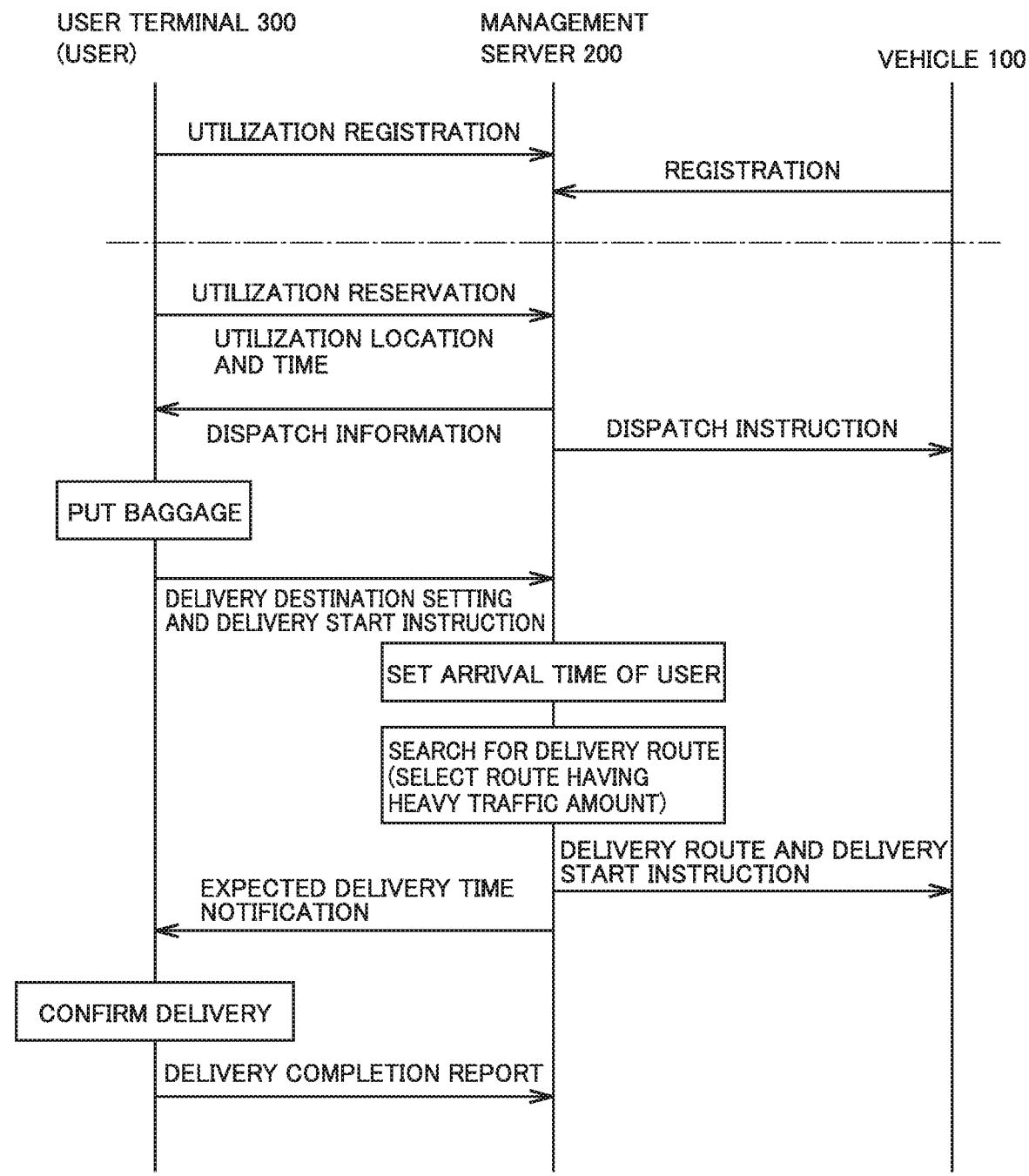
FIG. 5 is a sequence diagram showing exchange of information among respective elements of the delivery system according to the first embodiment.

FIG. 5 is a sequence diagram showing exchange of information among respective elements (vehicle 100, management server 200, and user terminal 300) of delivery system 10 according to the first embodiment. With reference to FIG. 5, the user who is to utilize delivery system 10 needs to make a utilization application for the system in advance. For example, utilization registration information is transmitted from user terminal 300 to management server 200. Moreover, vehicles 100 to be utilized in delivery system 10 are also registered in advance, and pieces of information of vehicles 100 are registered in management server 200.

The user who is to utilize delivery system 10 makes a utilization reservation from user terminal 300. When information required for the reservation (information for specifying the user, a utilizing location, a utilization time, and the like) is input into user terminal 300 the input information is transmitted from user terminal 300 to management server 200.

When management server 200 receives the information required for the reservation from user terminal 300, management server 200 assumes the received information as reservation information from the user, associates it with the ID of the user, and stores it in user information DB 221. Then, management server 200 makes reference to vehicle information DB 222 to select a vehicle 100 that can be dispatched to the user who has made the utilization reservation, transmits, to user terminal 300, dispatch information indicating vehicle 100 to be dispatched to the user as well as dispatch location and time of vehicle 100, and transmits a dispatch instruction to selected vehicle 100 to dispatch to the user.

When vehicle 100 receives the dispatch instruction from management server 200, vehicle 100 moves to the user at the designated location and time in accordance with the received dispatch instruction. It should be noted that when delivery system 10 is utilized in the utilization manner shown in FIG. 2, vehicle 100 may be constructed of a small electric vehicle (EV), and may be dispatched upon start of shopping so as to utilize vehicle 100 as a shopping cart, or may be dispatched to the user after end of shopping.

After the user finishes putting the baggage, which the user wishes to be delivered by vehicle 100, on vehicle 100, the user sets a delivery destination (for example, his/her home) from user terminal 300. Further, from user terminal 300, the user transmits a delivery start instruction to start delivery by vehicle 100.

When management server 200 receives the delivery destination and delivery start instruction for vehicle 100, the arrival time to the user delivery destination is set. For example, management server 200 can set, as the arrival time of the user to the delivery destination, an arrival time calculated using the service provided by transfer guidance server 320 for providing a traveling route from the current location of the user to the set delivery destination, a transportation to be utilized, utilization time, and the like.

It should be noted that the utilization of the service of transfer guidance server 320 may be performed by accessing transfer guidance server 320 from user terminal 300. Moreover, irrespective of whether or not the service provided by transfer guidance server 320 is utilized, the arrival time of the user to the delivery destination may be able to be set appropriately from user terminal 300.

Further, when the arrival time of the user to the delivery destination is set, management server 200 searches for a delivery route for vehicle 100 from the current location to the delivery destination to allow vehicle 100 to reach the delivery destination at the arrival time. In this case, management server 200 may select a delivery route having a relatively heavy traffic amount. For the traffic amount of the searched route, reference can be made to the service provided by traffic information server 340. By selecting the delivery route having a relatively heavy traffic amount, security can be increased during the baggage delivery performed by vehicle 100 performing unmanned driving.

It should be noted that the search for the delivery route for vehicle 100 may be performed by vehicle 100. In this case, the arrival time of the user to the delivery destination is notified from management server 200 to vehicle 100. Then, controller 160 of vehicle 100 uses navigation device 185 to search for a delivery route so as to allow vehicle 100 to reach the delivery destination at the arrival time.

When the delivery route for vehicle 100 from the current location to the set delivery destination is searched, management server 200 transmits information of the searched delivery route and a delivery start instruction to vehicle 100. It should be noted that when the search for the delivery route is performed by vehicle 100, the delivery start instruction is transmitted from management server 200 to vehicle 100. Moreover, management server 200 notifies an expected delivery time to user terminal 300. It should be noted that this expected delivery time corresponds to the arrival time of the user to the delivery destination.

Then, when the user reaches the delivery destination (for example, his/her home) using public transportation or the like and confirms that the baggage has been delivered by vehicle 100, the user transmits a delivery completion report from user terminal 300 to management server 200.

FIG. 6 shows a configuration of the data stored in user information DB 221 of management server 200. With reference to FIG. 6, an user ID is an identification number for specifying a user, and the user ID of a user who has made a reservation application is associated with: reservation information based on the reservation application from user terminal 300; a set delivery destination; route information indicating a traveling route of the user to the delivery destination; an arrival time of the user to the delivery destination: the current location of the user, and a utilization status of a vehicle 100 to be utilized.

The reservation information includes utilization location and utilization time each input when making the reservation application from user terminal 300. The route information stores information indicating the traveling route of the user presented by the service provided by transfer guidance server 320 when the service of transfer guidance server 320 is utilized. The current location stores location information which user terminal 300 has. Accordingly, the location information of user terminal 300 is regularly transmitted from user terminal 300 to management server 200.

The utilization status includes: the vehicle ID of vehicle 100 selected based on the reservation information; and the data of the delivery status (before delivery, during delivery, delivery completed, and the like). As one example, it is indicated that a vehicle 100 having a vehicle ID of E002 is utilized for a user having a user ID of U0002, and is currently performing delivery and will reach a set delivery destination Y2 at an arrival time of 17:30.

FIG. 7 shows a configuration of the data stored in vehicle information DB 222 of management server 200. With reference to FIG. 7, the vehicle ID is an identification number for specifying a vehicle 100, and is associated with various types of data such as: the utilization status of that vehicle 100; traveling route information indicating a traveling route for vehicle 100 to the delivery destination; the current location of vehicle 100, delivery time to the set delivery destination; the SOC of the power storage device; and the like.

The utilization status includes data indicating that vehicle 100 is waiting to dispatch, is currently performing delivery to the set delivery destination, is in a standby state, or has completed delivery. It should be noted that the term "standby state" indicates a state in which vehicle 100 stands by at a parking area or the like in order to adjust the arrival time of vehicle 100 to the delivery destination. The standby state is not essential in the first embodiment and will be described in a second embodiment below.

The traveling route information stores information indicating the searched traveling route for vehicle 100 to allow vehicle 100 to reach the delivery destination at the arrival time of the user to the delivery destination. The current location stores the location information of vehicle 100 specified by GPS receiver 186. The delivery time is a delivery time to the delivery destination when vehicle 100 travels in accordance with the traveling route indicated in the traveling route information, and corresponds to the arrival time of the user to the delivery destination. It should be noted that the current location and SOC of vehicle 100 are regularly transmitted from vehicle 100 to management server 200, and are stored in vehicle information DB 222.

Figure 8:
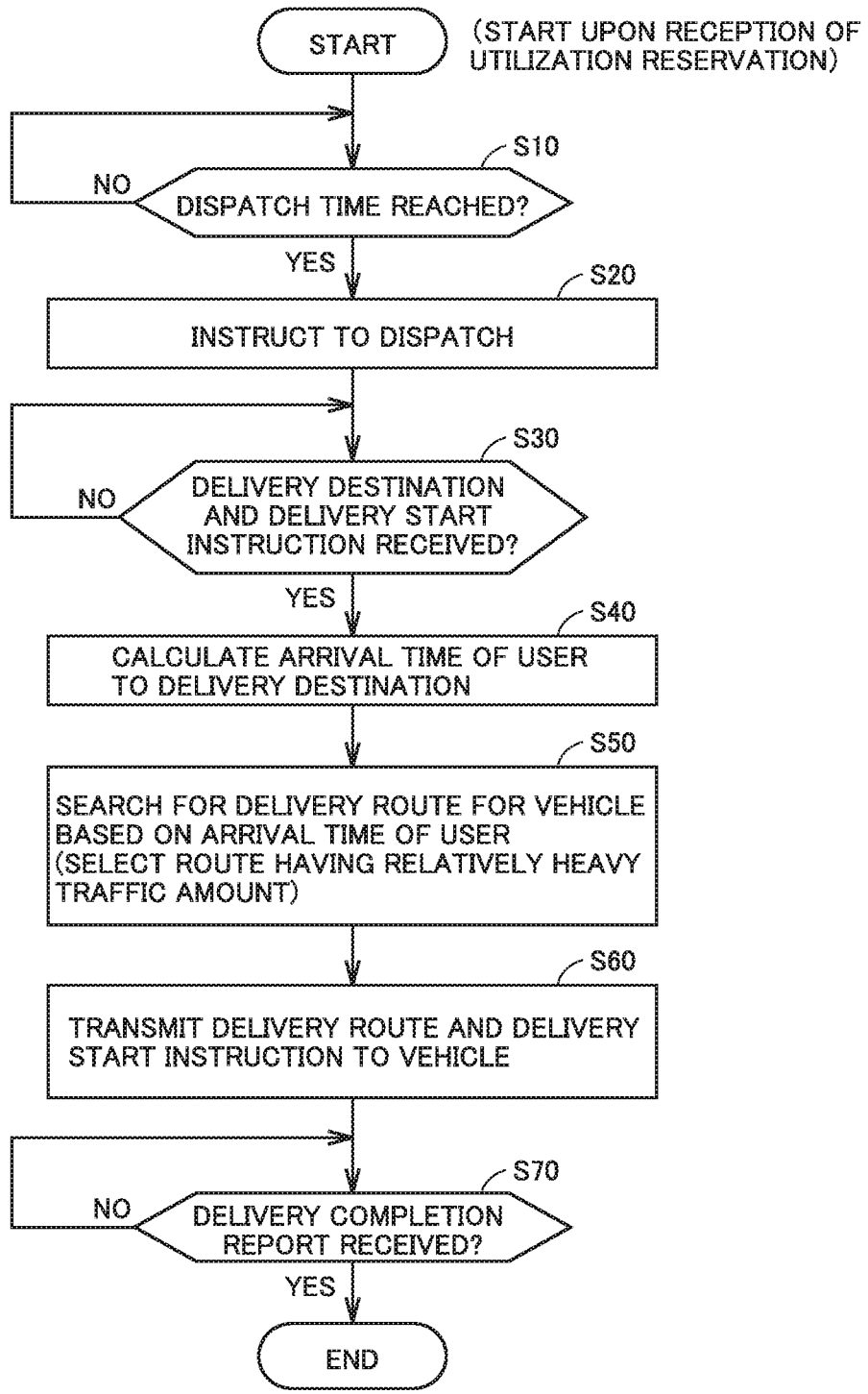
FIG. 8 is a flowchart for illustrating a procedure of processes performed by a processor of the management server.

FIG. 8 is a flowchart for illustrating a procedure of processes performed by processor 230 of management server 200. The series of processes shown in this flowchart are started when an application for utilization reservation is received from user terminal 300.

With reference to FIG. 8, when management server 200 (processor 230) receives the reservation application from user terminal 300, server 200 assumes the information regarding the received reservation application as reservation information from the user, associates it with the user ID of the user, and stores it in user information DB 221. Then, management server 200 makes reference to the utilization location and utilization time indicated in the reservation information, so as to determine whether or not a dispatch time of vehicle 100 to the user is reached (step S10).

When it is determined that the dispatch time is reached (YES in step S10), management server 200 transmits a dispatch instruction to vehicle 100 (step S20). Next, when management server 200 receives the delivery destination of vehicle 100 and the delivery start instruction from user terminal 300 (YES in step S30), management server 200 sets the arrival time of the user to the delivery destination (step S40). This arrival time may be calculated using the service provided by transfer guidance server 320, or may be set appropriately by the user from user terminal 300.

Next, based on the arrival time of the user set in step S40, management server 200 searches for a delivery route for vehicle 100 (step S50). Specifically, management server 200 searches for a delivery route for vehicle 100 from the current location to the delivery destination to allow vehicle 100 to reach the delivery destination at the arrival time set in step S40.

It should be noted that in this case, management server 200 may select a delivery route having a relatively heavy traffic amount. For example, when a first route and a second route with a heavier traffic amount than that of the first route are searched as the delivery route for vehicle 100 from the current location to the delivery destination, the second route may be selected. For the traffic amount of the searched route, reference can be made to the service provided by traffic information server 340.

Further, when the delivery route to the delivery destination of vehicle 100 is searched, management server 200 transmits the delivery route and a delivery start instruction to vehicle 100 (step S60). Then, when management server 200 receives a delivery completion report from user terminal 300 as a result of the user confirming the delivery to the delivery destination by vehicle 100 (YES in step S70), management server 200 brings the process to the end.

As described above, according to the first embodiment, since vehicle 100 reaches the delivery destination in accordance with the arrival time of the user to the delivery destination, the baggage can be delivered to the delivery destination on time. Hence, there can be implemented a delivery system highly convenient for a user having no driver's license, a user having a difficulty in driving a movable body, or the like.

Moreover, since the route having a relatively heavy traffic amount is selected for the delivery route for vehicle 100, security can be increased during the baggage delivery performed by vehicle 100 performing unmanned driving.

Second Embodiment

In this second embodiment, vehicle 100 is brought into the standby state at a parking area when vehicle 100 will reach the delivery destination (for example, the user's home) at a time earlier than the arrival time of the user to the delivery destination. Accordingly, the baggage can be delivered to the delivery destination on time in accordance with the arrival time of the user without bringing vehicle 100 into the standby state in front of the delivery destination such as the home.

Moreover, in this second embodiment, when a power supply facility for external charging is installed at the parking area for standby of vehicle 100 and the SOC of vehicle 100 in the standby state at the parking area is low, vehicle 100 is externally charged using the power supply facility during the standby state. Accordingly, during the standby time at the parking area, power storage device 110 can be charged using the power supply facility.

Figure 9:
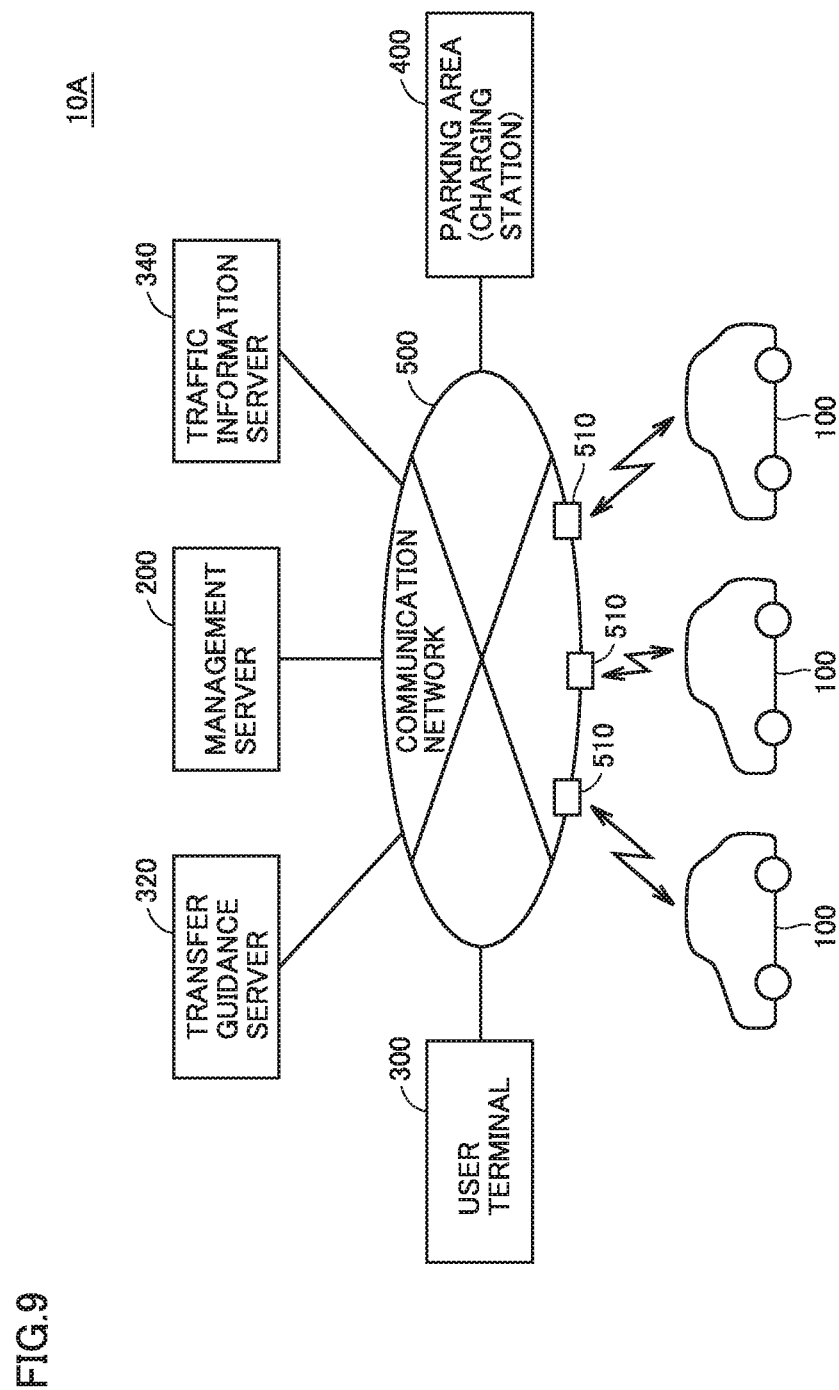
FIG. 9 schematically shows an entire configuration of a delivery system according to a second embodiment.

FIG. 9 schematically shows an entire configuration of an delivery system 10A according to the second embodiment. With reference to FIG. 9, in the configuration of delivery system 10 according to the first embodiment shown in FIG. 1, delivery system 10A further includes a parking area 400. Parking area 400 is utilized for standby of vehicle 100 when vehicle 100 reaches the delivery destination at a time earlier than the arrival time of the user to the delivery destination. Parking area 400 may include a power supply facility capable of supplying charging power to vehicle 100, and in the description below, it is assumed that parking area 400 includes the power supply facility.

Figure 10:
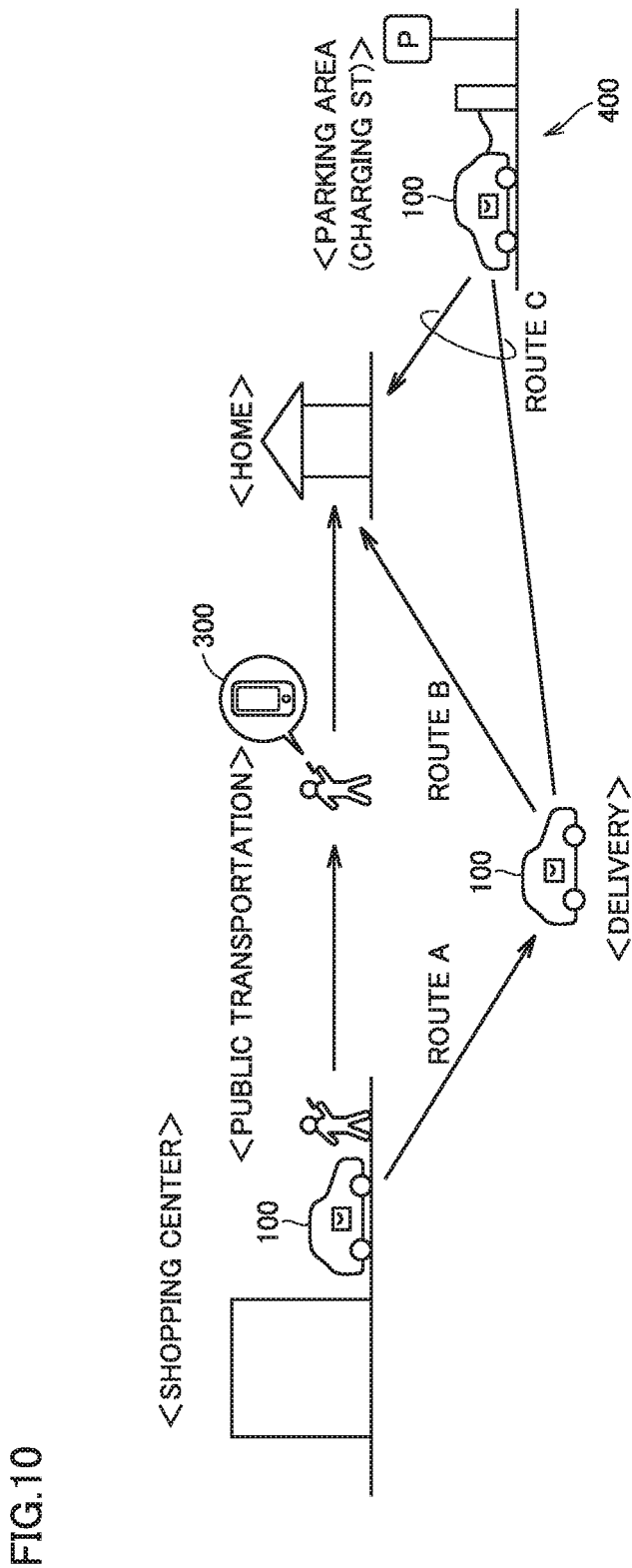
FIG. 10 shows an exemplary utilization manner of the delivery system according to the second embodiment.

FIG. 10 shows an exemplary utilization manner of delivery system 10A according to the second embodiment. This example corresponds to the one example of the utilization manner of delivery system 10 in the first embodiment shown in FIG. 2.

With reference to FIG. 10, also in this example, there is provided a service in which: the user, who did shopping in a shopping center, a supermarket, or the like, puts a baggage with purchased items onto vehicle 100 and sets a delivery destination (hereinafter, referred to as "home"), and the baggage is delivered to the home using vehicle 100 configured to perform unmanned driving. The user does not ride on vehicle 100, and moves to the home using public transportation or the like.

Further, when the arrival time of the user to the home is set, vehicle 100 moves to the home in accordance with a delivery route searched to allow vehicle 100 to reach the home at the set arrival time. Here, when the searched delivery route at the time of departing from the shopping center is a route via routes A and B but vehicle 100 will reach the delivery destination at a time earlier than the arrival time of the user by a predetermined time if the original delivery route is employed because, for example, the arrival time of the user is changed to a time after the originally set arrival time, route B is changed to a route C. Route C is a route via parking area 400. By bringing vehicle 100 into the standby state at parking area 400, the delivery time is adjusted.

Further, in this example, the SOC of power storage device 110 of vehicle 100 is low, so that power storage device 110 is externally charged using the power supply facility in the standby state at parking area 400. Further, when a standby end time calculated back from the arrival time of the user is reached, vehicle 100 moves to the user's home from parking area 400. Accordingly, vehicle 100 reaches the home in accordance with the arrival time of the user to the home, whereby the baggage can be delivered to the home on time.

Figure 11:
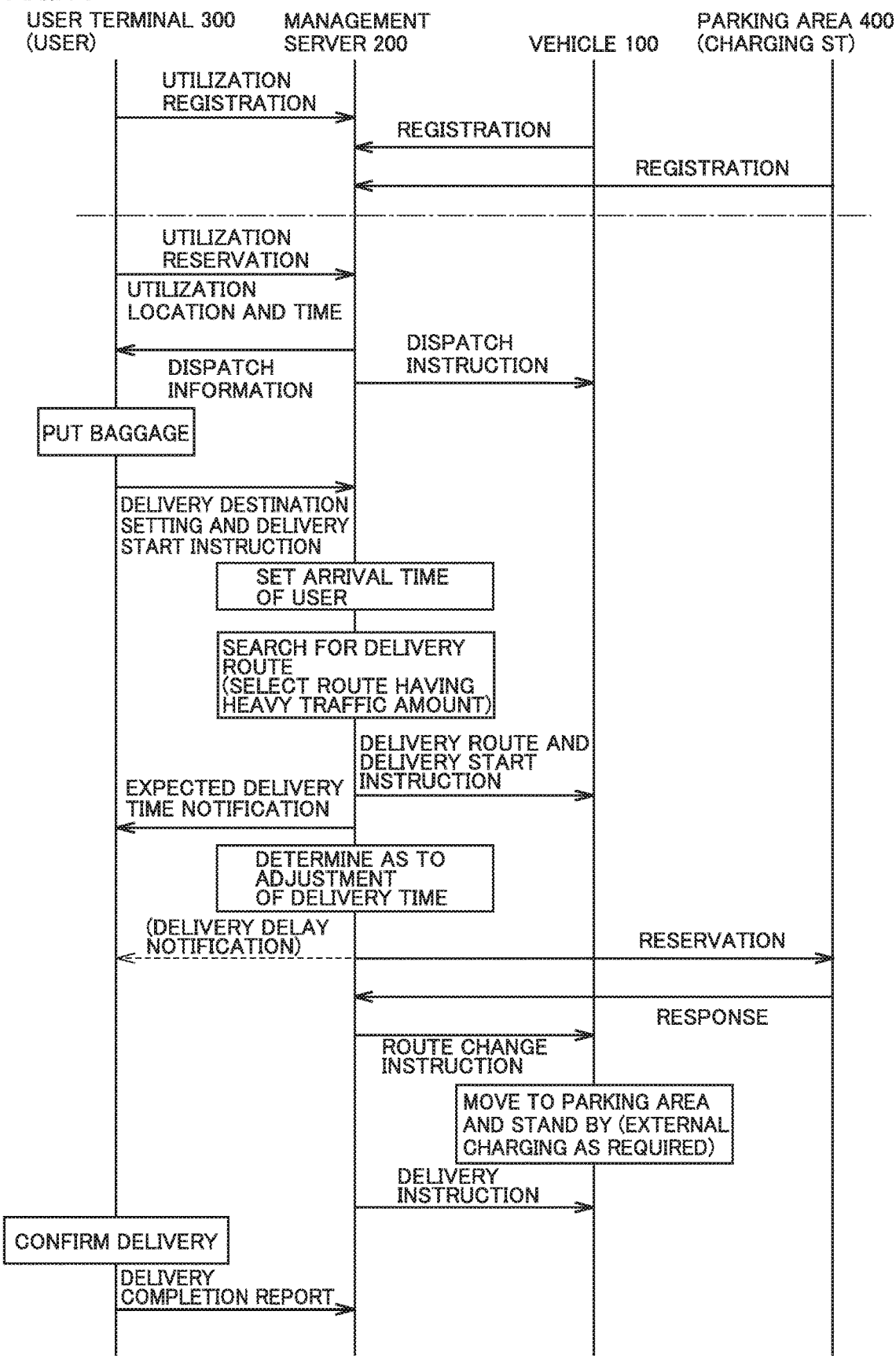
FIG. 11 is a sequence diagram showing exchange of information among respective elements of a delivery system according to the second embodiment.

FIG. 11 is a sequence diagram showing exchange of information among respective elements (vehicle 100, management server 200, user terminal 300, and parking area 400) of delivery system 10A according to the second embodiment. With reference to FIG. 11, a series of flow until the expected delivery time is notified from management server 200 to user terminal 300 is the same as that in the sequence diagram in the first embodiment shown in FIG. 5, and therefore will not be repeatedly described.

After the expected delivery time is notified from management server 200 to user terminal 300, management server 200 determines whether or not the delivery time to the delivery destination by vehicle 100 needs to be adjusted. When the delivery time of vehicle 100 will become earlier than the arrival time of the user to the delivery destination by a predetermined time (for example, more than or equal to 15 minutes), management server 200 transmits a utilization reservation to a parking area 400 near the delivery destination. Then, when management server 200 receives a response from parking area 400 to indicate that parking area 400 is utilizable, management server 200 transmits a delivery route change instruction to vehicle 100 in order to bring vehicle 100 into the standby state at parking area 400. Accordingly, vehicle 100 moves to parking area 400 and will be in the standby state at parking area 400 until a standby end time calculated back from the arrival time of the user is reached. It should be noted that during the standby at parking area 400, depending on the SOC of power storage device 110, the external charging is performed appropriately using a power supply facility thereof.

It should be noted that when the delivery time of vehicle 100 is expected to be delayed from the arrival time of the user to the delivery destination, a delivery delay is notified from management server 200 to user terminal 300 as indicated by a dotted line. Accordingly, the user can recognize that the delivery of vehicle 100 will be delayed.

When the standby end time at parking area 400 is reached, management server 200 transmits a delivery instruction to vehicle 100 that is in the standby state at parking area 400. Then, when the user reaches the delivery destination (for example, his/her home) using public transportation or the like and confirms that the baggage has been delivered by vehicle 100, the user transmits a delivery completion report from user terminal 300 to management server 200.

Figure 12:
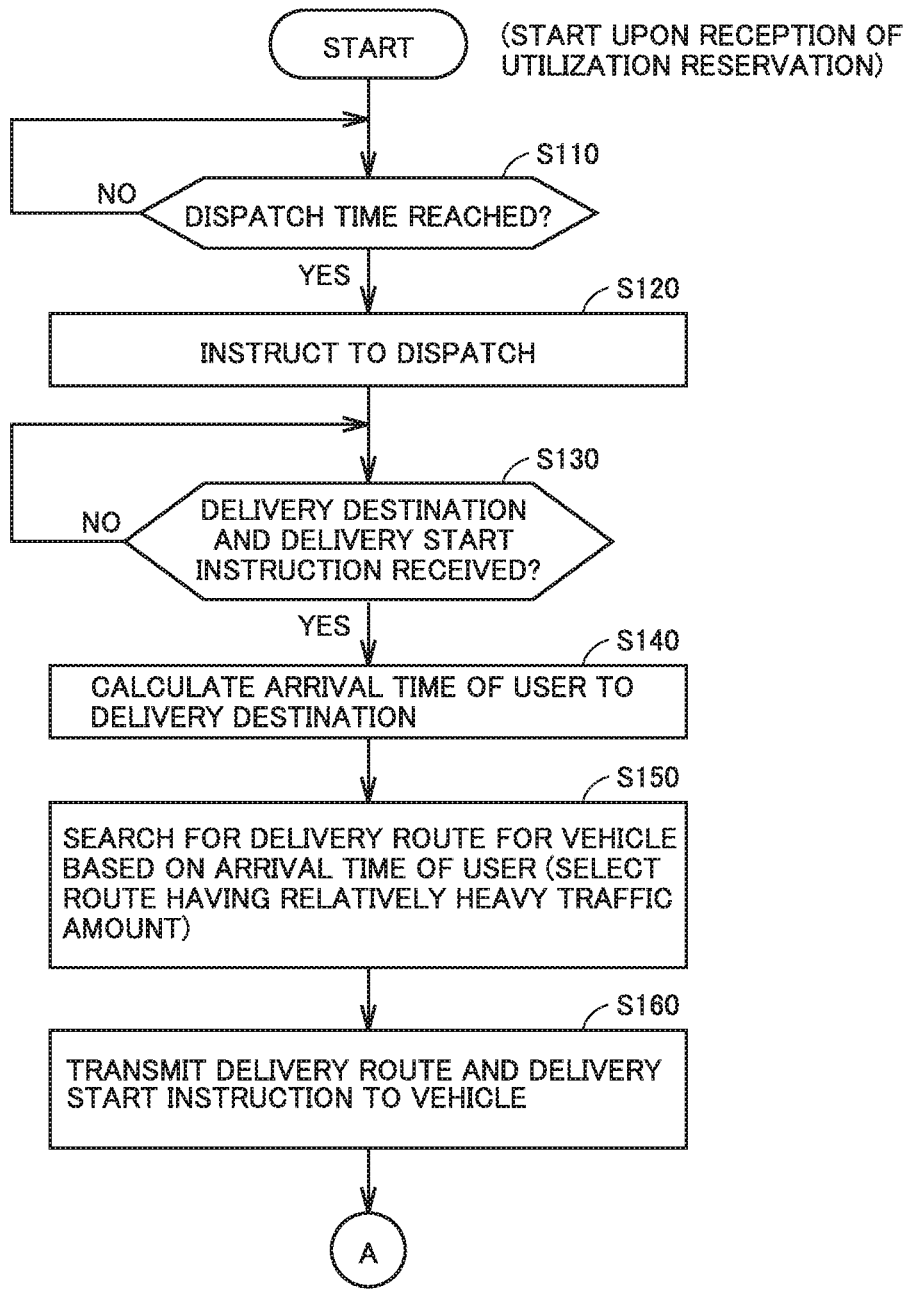
FIG. 12 is a first flowchart for illustrating a procedure of processes performed by a processor of a management server in the second embodiment.
Figure 13:
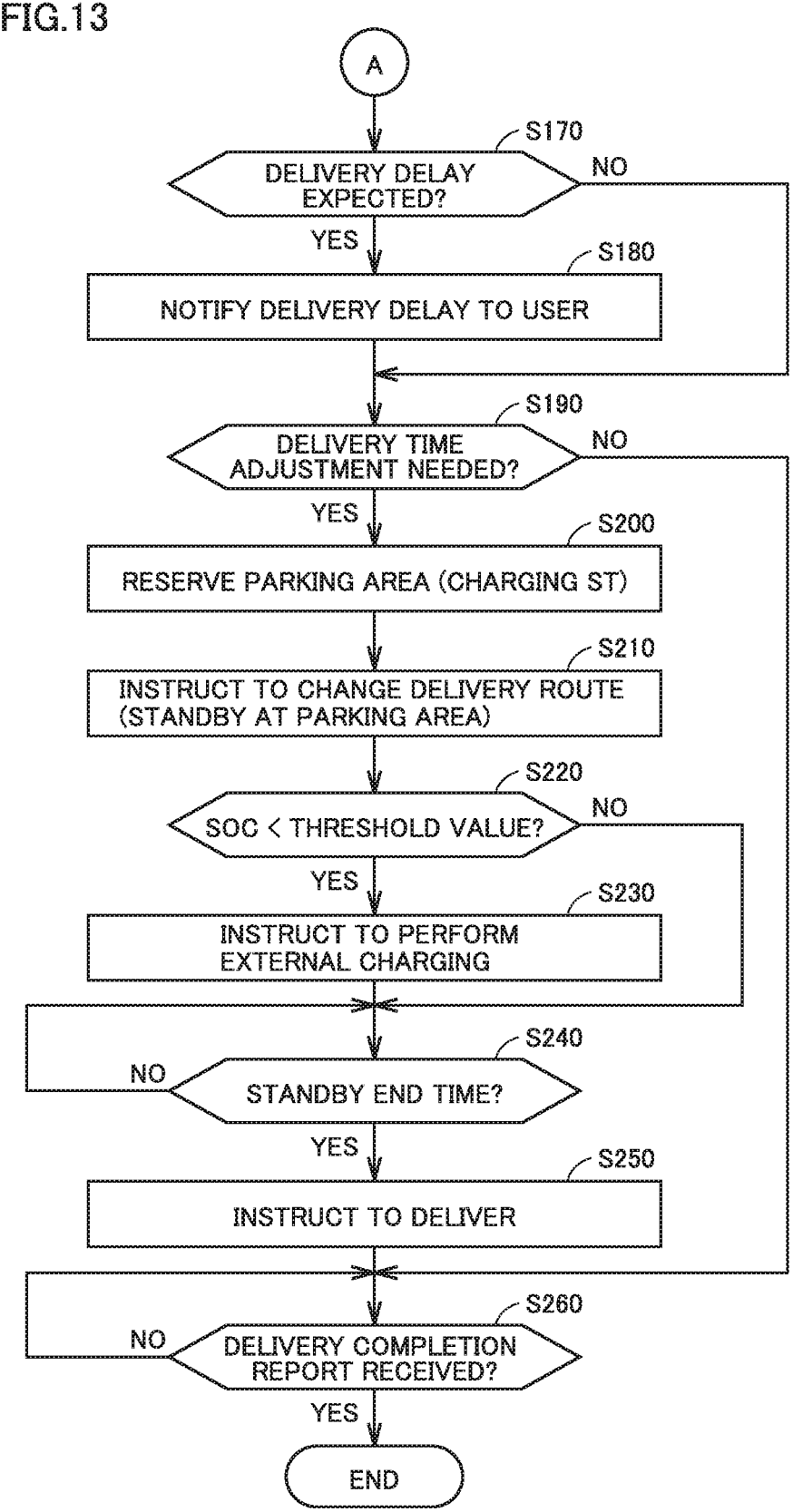
FIG. 13 is a second flowchart for illustrating a procedure of processes performed by the processor of the management server in the second embodiment.

Each of FIG. 12 and FIG. 13 is a flowchart for illustrating a procedure of processes performed by processor 230 of management server 200 in the second embodiment. The series of processes shown in this flowchart are also started when an application for utilization reservation is received from user terminal 300.

With reference to FIG. 12, the processes performed in step S110 to step S160 are respectively the same as the processes performed in step S10 to step S60 shown in FIG. 8 and therefore will not be repeatedly described.

Then, when the delivery route and the delivery start instruction are transmitted to vehicle 100 in step S160, with reference to FIG. 13, management server 200 determines whether or not the delivery to the delivery destination by vehicle 100 is expected to be delayed (step S170). Specifically, management server 200 determines whether or not vehicle 100 can reach the delivery destination at the set arrival time of the user to the delivery destination. For example, the delivery is expected to be delayed when it is considered that the delivery will be delayed by more than or equal to 10 minutes. When management server 200 determines that vehicle 100 cannot reach the delivery destination at the arrival time of the user to the delivery destination (YES in step S170), management server 200 notifies a delivery delay to user terminal 300 (step S180). It should be noted that together with the notification of the delivery delay, an expected delivery time may be notified to user terminal 300.

Next, management server 200 determines whether or not the delivery time to the delivery destination by vehicle 100 needs to be adjusted (step S190). Specifically, management server 200 determines whether or not the delivery time of vehicle 100 becomes earlier than the arrival time of the user to the delivery destination by a predetermined time (for example, more than or equal to 15 minutes). When management server 200 determines that the delivery time does not need to be adjusted (NO in step S190), the process is brought to a below-described step S260.

On the other hand, when management server 200 determines that the delivery time needs to be adjusted in step S190 (YES in step S190), management server 200 searches for a parking area near the delivery destination, and transmits a utilization reservation to parking area 400 (including a charging facility) (step S200). Then, when the reservation is confirmed, management server 200 transmits a delivery route change instruction to vehicle 100 to bring vehicle 100 into the standby state at parking area 400 (step S210).

During the standby of vehicle 100 at parking area 400, management server 200 makes reference to vehicle information DB 220 so as to obtain data of the SOC of vehicle 100 that is in the standby state at parking area 400. When the SOC is lower than a threshold value (YES in step S220), management server 200 transmits an instruction to vehicle 100 to perform external charging so as to charge power storage device 110 of vehicle 100 using the power supply facility installed at parking area 400 (step S230).

Then, management server 200 determines whether or not a standby end time calculated from the arrival time of the user to the delivery destination and the traveling time of vehicle 100 from parking area 400 to the delivery destination is reached (step S240). When management server 200 determines that the standby end time is reached (YES in step S240), management server 200 transmits a delivery instruction to vehicle 100 (step S250).

Then, when management server 200 receives the delivery completion report from user terminal 300 as a result of the user confirming the delivery to the delivery destination by vehicle 100 (YES in step S260), management server 200 brings the process to the end.

As described above, according to this second embodiment, when it is determined that vehicle 100 will reach the delivery destination at a time earlier than the arrival time of the user to the delivery destination, vehicle 100 stands by at parking area 400, whereby the baggage can be delivered to the delivery destination on time in accordance with the arrival time of the user to the delivery destination.

Moreover, according to the second embodiment, when parking area 400 includes a power supply facility and the SOC of power storage device 110 of vehicle 100 is low, during the standby time at the parking area, power storage device 110 can be charged using the power supply facility.

Moreover, according to the second embodiment, when it is determined that vehicle 100 cannot reach the delivery destination at the arrival time of the user to the delivery destination, the delivery delay notification is transmitted to user terminal 300. Hence, the user can recognize that the delivery of the baggage by vehicle 100 will be delayed.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A delivery system comprising:
a vehicle configured to perform unmanned driving and to deliver a baggage to a designated delivery destination; and
a server configured to:
communicate with the vehicle,
when an arrival time of a user, who moves to the delivery destination without riding on the vehicle, to the delivery destination is set, transmit, to the vehicle, an instruction for moving the vehicle in accordance with a delivery route searched to allow the vehicle to reach the delivery destination at the set arrival time,
the vehicle moving to the delivery destination in accordance with the instruction, wherein
the server searches for a first route and a second route as the delivery route, wherein each of the first route and the second route allow for the vehicle to arrive at the delivery destination at the set arrival time of the user, the server determines a traffic amount for each of the first route and the second route that have been determined to allow for the vehicle to arrive at the delivery destination at the set arrival time of the user, and based on the traffic amount for each of the first route and the second route, the server selects, as the delivery route, one of the first route and the second route that has a heavier traffic amount.

2. The delivery system according to claim 1, wherein when it is determined that the vehicle is unable to reach the delivery destination at the set arrival time, the server is configured to transmit a delivery delay notification to a mobile terminal of the user.

3. The delivery system according to claim 1, wherein when it is determined that the vehicle will reach the delivery destination at a time earlier than the set arrival time by a predetermined time, the server is configured to transmit, to the vehicle, a standby instruction for bringing the vehicle into a standby state at a parking area.

4. The delivery system according to claim 3, wherein the vehicle includes
a battery configured to store power for traveling, and
a charger configured to charge the battery using power supplied from a power supply facility external to the vehicle,
the power supply facility is provided at the parking area, and
the standby instruction includes an instruction for bringing the vehicle into the standby state while charging the battery using the power supply facility at the parking area.

5. A server comprising:
a communication device configured to communicate with a vehicle, the vehicle being configured to perform unmanned driving and used to deliver a baggage to a designated delivery destination; and
a processor configured to perform first and second processes,
the first process being a process for, when an arrival time of a user, who moves to the delivery destination without riding on the vehicle, to the delivery destination is set, searching for a delivery route to allow the vehicle to reach the delivery destination at the set arrival time,
the second process being a process for transmitting, to the vehicle via the communication device, an instruction for moving the vehicle in accordance with the searched delivery route, wherein
the first process includes searching for a first route and a second route as the delivery route, wherein each of the first route and the second route allow for the vehicle to arrive at the delivery destination at the set arrival time of the user,
the first process determines a traffic amount for each of the first route and the second route that have been determined to allow for the vehicle to arrive at the delivery destination at the set arrival time of user, and based on the traffic amount for each of the first route and the second route, the first process selects, as the delivery route, one of the first route and the second route that has a heavier traffic amount.

6. A vehicle configured to perform unmanned driving and used to deliver a baggage to a designated delivery destination, the vehicle comprising:
a communication device configured to communicate with a server; and
a controller configured to receive, from the server via the communication device, a setting of an arrival time of a user, who moves to the delivery destination without riding on the vehicle, to the delivery destination,
the controller being configured to
search for a delivery route to allow the vehicle to reach the delivery destination at the set arrival time, and
perform control for moving the vehicle in accordance with the searched delivery route, wherein
the controller searches for a first route and a second route as the delivery route, wherein each of the first route and the second route allow for the vehicle to arrive at the delivery destination at the set arrival time of the user,
the controller determines a traffic amount for each of the first route and the second route that have been determined to allow for the vehicle to arrive at the delivery destination at the set arrival time of user, and
based on the traffic amount for each of the first route and the second route, the controller selects one of the first route and the second route that has a heavier traffic amount than a traffic amount of the first route as the delivery route.

7. A method for delivering a baggage to a designated delivery destination using a vehicle configured to perform unmanned driving, the method comprising:
setting an arrival time of a user, who moves to the delivery destination without riding on the vehicle, to the delivery destination;
searching a first route and a second as a delivery route to allow the vehicle to reach the delivery destination at the set arrival time, wherein each of the first route and the second route allow for the vehicle to arrive at the delivery destination at the set arrival time of the user;
determining a traffic amount for each of the first route and the second route that have been determined to allow for the vehicle to arrive at the delivery destination at the set arrival time of the user;
based on the traffic amount for each of the first route and the second route, selecting one of the first route and the second route that has a heavier traffic amount;
transmitting, to the vehicle, an instruction for moving the vehicle in accordance with the delivery route; and
moving the vehicle to the delivery destination in accordance with the instruction.

\* \* \* \* \*